June 22, 1937.  H. H. McKEE ET AL  2,084,856
MEANS FOR DEHAIRING HOGS
Filed Feb. 27, 1935  5 Sheets-Sheet 1
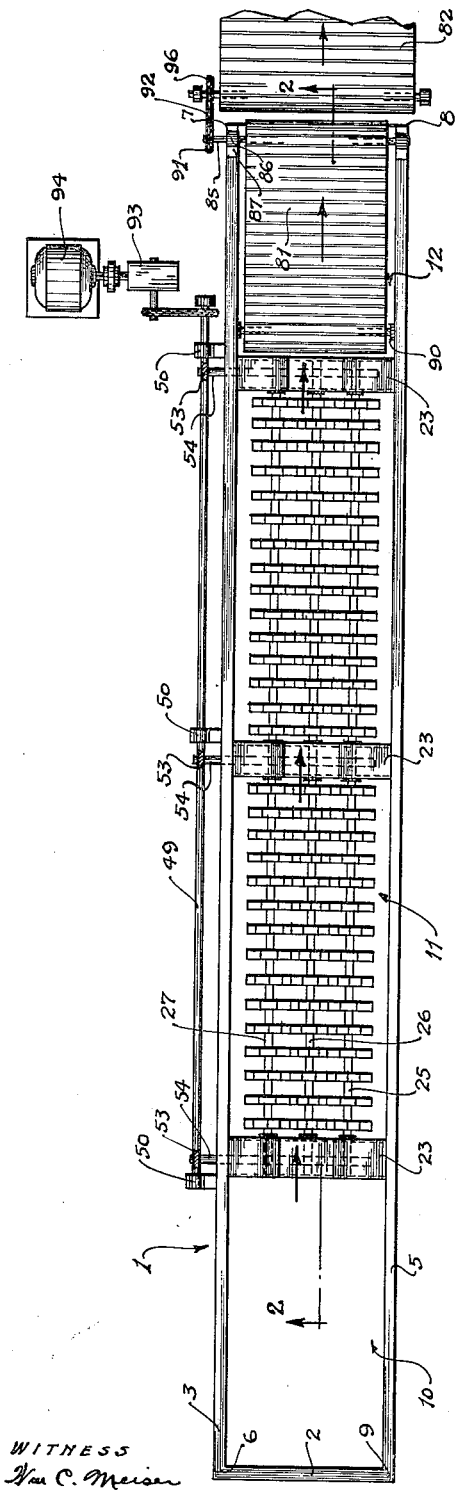
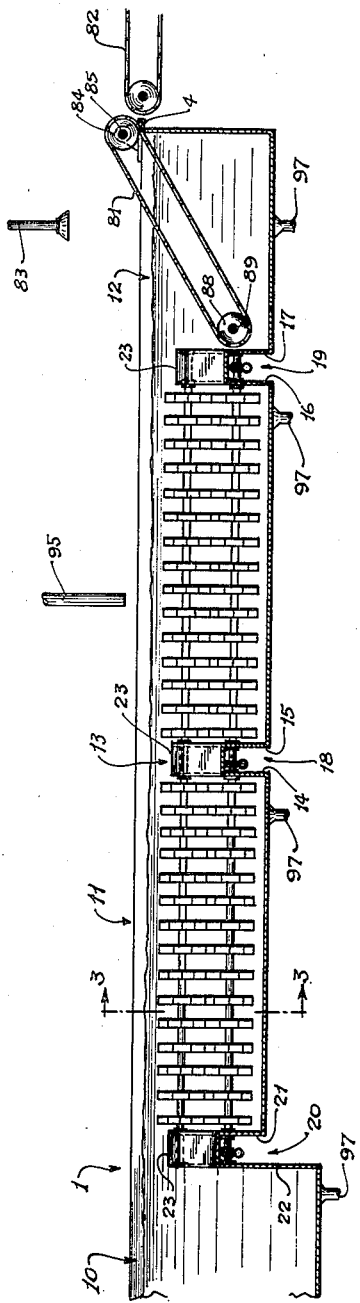
Harry H. McKee
and Keith Muir
INVENTORS
ATTORNEY June 22, 1937.   H. H. McKEE ET AL   2,084,856
MEANS FOR DEHAIRING HOGS
Filed Feb. 27, 1935   5 Sheets-Sheet 2

Harry H. McKee
and Keith Muir
INVENTORS

WITNESS:
Wm C. Meiser

BY G. Fay W. Johns
ATTORNEY

Harry H. McKee
and Kieth Muir
INVENTORS

Harry H. McKee
and Keith Muir
INVENTORS

Patented June 22, 1937

2,084,856

UNITED STATES PATENT OFFICE 2,084,856

MEANS FOR DEHAIRING HOGS

Harry H. McKee, Chicago, Ill., and Keith Muir, Baltimore, Md., assignors to Industrial Patents Corporation, Chicago, Ill., a corporation of Delaware Application February 27, 1935, Serial No. 8,514

15 Claims. (Cl. 17—13)

This invention relates to an improved apparatus for dehairing animal carcasses and is particularly adapted to dehairing hog carcasses.

One of the objects of this invention is to provide an apparatus for simultaneously scalding and dehairing hog carcasses.

Another object of the invention is to provide means for maintaining the surface of the hog carcass at a uniform temperature throughout the dehairing operation.

Another object of the invention is to provide means for completely removing the hair from the most inaccessible parts of the hog carcass.

Another object of the invention is to provide adjustable dehairing means for exacting an even scraping pressure against all carcasses according to the average weight of the animals being slaughtered.

Another object of the invention is to provide means for scalding, dehairing and rinsing hog carcasses each in sequence and all in one continuous operation.

Other objects of the invention will be apparent from the description and claims that follow.

In conventional abattoir practice hogs are run into a shackling pen where, by means of a chain hooked about one hind leg, they are elevated to an overhead conveyor to be carried past an operator who opens the jugular vein with a knife. The hog then continues on the conveying means for a suitable distance to permit completion of the bleeding. At this juncture, the hog is released from the conveyor and allowed to drop into a tank of warm water, from which it is transferred to a tank of scalding water, and then conveyed to a dehairing apparatus.

In the present practice, the carcass, upon being conveyed from the scalding tank to the dehairing apparatus, is exposed to the air for several minutes, and, due to rapid radiation of the heat from the hot skin to the cooler air during the interval of exposure, is somewhat chilled, causing a contracting effect and the pores in the skin to shrink in size, thereby making more difficult removal of hair from the cooled sections. In practice, this objection is partially overcome by means of continuously spraying the carcass with scalding water during the dehairing operation to maintain the scalding temperature, but such means is unsatisfactory because of some parts of the carcass drying more quickly than others and such parts not being fully resaturated or sufficiently reheated by the spray.

The present invention is concerned primarily with the treatment of hogs from the time they leave the bleeding conveyor until they are deposited on a gambrel conveyor, and proposes to scald, dehair, and rinse hog carcasses, singly or in close succession, in one continuous operation in such a manner that the carcass will be totally maintained at a scalding temperature throughout the dehairing operation.

A preferred embodiment of the present invention is disclosed in the accompanying drawings, in which similar reference characters in the several figures designate similar parts.

Figure 1 is a plan view showing the preferred embodiment of this invention.

Figure 2 is a longitudinal sectional view taken on line 2—2 of Figure 1.

Figure 3:
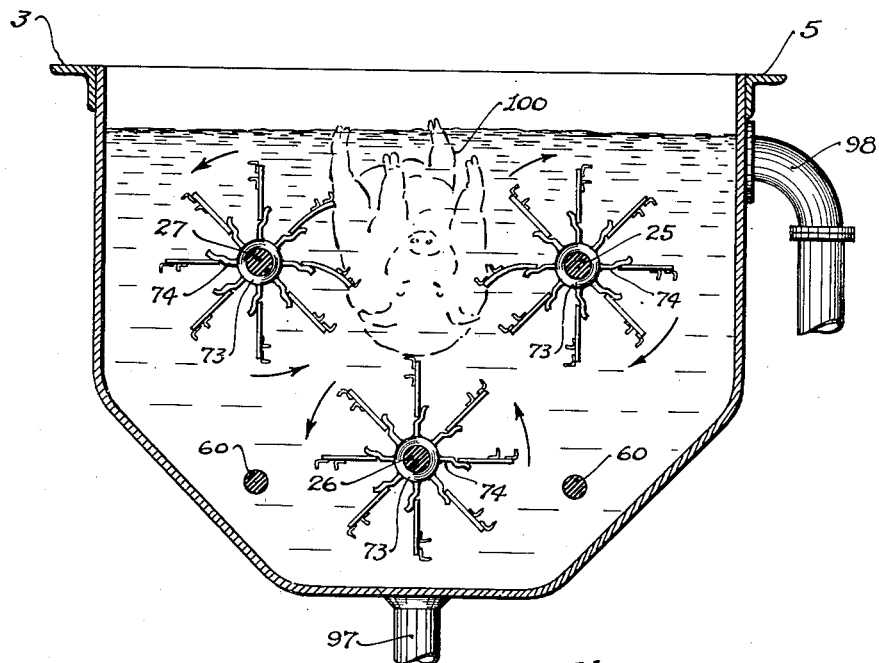
Figure 3 is a vertical sectional view of the beater or dehairing section of the present invention taken on line 3—3 of Figure 2, showing a hog carcass in the process of being dehaired.

Referring now more particularly to Figures 1 and 2 of the drawings, the framework of the apparatus used in the present invention comprises an elongated metal tank 1 braced on each of its four sides by angle irons 2, 3, 4, and 5 secured to the upper edges thereof by bolts, rivets or other suitable means, said angle irons being joined at their respective ends 6, 7, 8, and 9 by bolts, rivets or welding. The tank 1 is divided into sections 10, 11 and 12. Section 10 will be hereinafter referred to as the scalding section, section 11 as the dehairing section, and section 12 as the rinsing section. Section 11 by reason of its length is subdivided at 13 to permit additional bearings to relieve the stress on beater shafts 25, 26, and 27, hereinafter described.

It will be noted in Figure 2 that the scalding section 10 is of greater depth than sections 11 and 12 to allow the hog carcasses being dropped from the bleeding conveyor a suitable descent without striking the bottom, thereby preventing unnecessary bruising or tearing of the skin.

Figure 5:
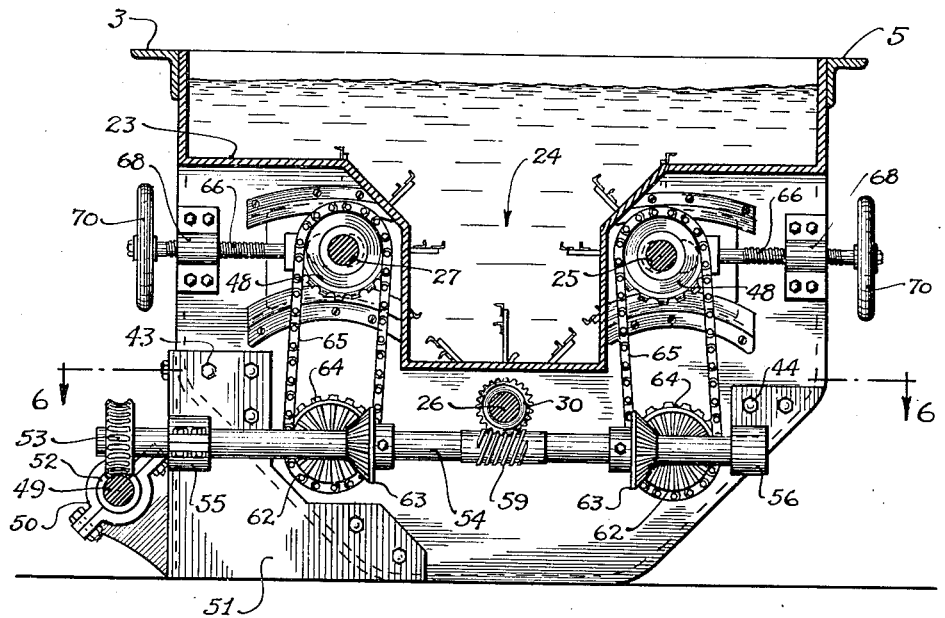
Figure 5 is a view taken on line 5—5 of Figure 4, showing in detail a front view of the mechanism for driving the beater shafts.

At subdivision 13 in section 11 and between sections 11 and 12, partition walls 14 and 15, and 16 and 17 respectively, substantially of a shape and height shown in Figure 5, are spaced at a suitable distance to form chambers 18 and 19 respectively to permit housing of mechanism hereinafter described. Between sections 10 and 11, a chamber 20 similar to chambers 18 and 19 is formed by partition walls 21 and 22. Partition wall 21 is in size and shape like partition wall 14, and partition wall 22 is similar to partition wall 21 except for greater height to compensate for the greater depth of section 10. The partition walls 14, 15, 16, 17, 21, and 22 are at their outer edges welded to the side walls and bases of their respective sections. The partition walls 21 and 22, 14 and 15, and 16 and 17 are spanned by aprons 23, bent to conform to the irregular tops of the partition walls, said aprons at their ends being welded in a leakproof manner to their respective partition walls, and the sides of said aprons being likewise welded to the sides of tank 1. By means of aprons 23 and the various partition walls, it will be seen that chambers 18, 19, and 20 provide housings for the driving mechanism, and that such mechanism will be kept free of water and rust, while a continuous flow of water will be permitted between the several sections. It will also be seen in Figure 5 that the various aprons 23 are so shaped as to provide convenient passageways 24 for permitting hog carcasses to pass between the several sections.

Figure 12:
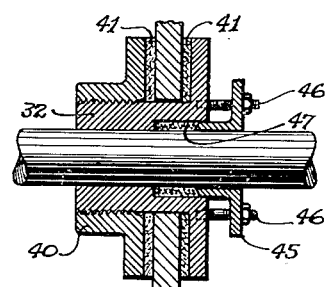
Figure 12 is a detail view of a stationary bearing for shafts which are not adjustable.

The dehairing section is provided with beater shafts 25, 26, and 27. The shaft 26 for convenience will be termed the lower beater shaft, and shafts 25 and 27 the upper beater shafts. The shaft 26 is journaled in bearings 28, which are of the type shown in Figure 12, mounted in partition walls 21, 14, 15, and 16 and also in thrust bearings 29 rigidly secured to the outer faces of partition walls 17 and 22. A worm wheel 30 by which shaft 26 is driven is pinioned to shaft 26 at a suitable point in each of the chambers 18, 19, and 20.

Figure 9:
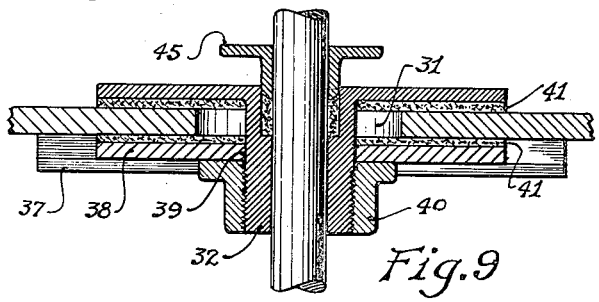
Figure 9 is a sectional view taken on line 9—9 of Figure 7.
Figure 11:
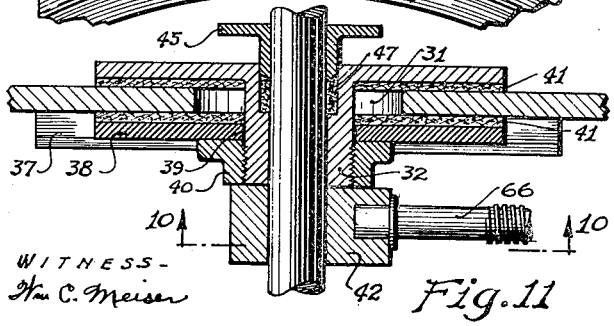
Figure 11 is a sectional view taken on line 11—11 of Figure 10.

As shown in Figure 5, the partition walls 21, 14, 15, and 16 on each side of the passageways 24, and near the top, are slotted at 31 to permit an adjustable range for the shafts 25 and 27. As shown in Figures 9 and 11, a bearing 32 having a slidable range equal to the length of slots 31 is securely held in place by adjustable screws 66. On the exterior faces of the partition walls 21, 14, 15, and 16, at a suitable distance above and below the slots 31, are securely affixed by means of stud bolts 36, elongated brackets 37, in each of which is slidably mounted a plate 38 having an opening 39 through which passes bearing 32. A flange 40 is threaded on bearing 32, to securely clamp plate 38 and bearing 32 about opening 31. The water side of bearing 32 is provided with packing gland 45 for holding packing 47 about the shaft. Gland 45 is held to bearing 32 by stud bolts 46. Inasmuch as the apparatus, when in operation, is filled with water above the slots 31, the plates 38 and bearings 32 adjacent the partition walls are each faced with a sheet 41 of rubber or other suitable material which act as water seal gaskets between the plates 38 and bearings 32 and their respective partition walls immediately surrounding the slots 31, thereby allowing only a minimum of leakage through the slots 31. The plates 38 are of such size as to provide complete coverage of slots 31 at any adjustment of the shafts 25 and 27.

Shafts 25 and 27 are driven by means of sprocket wheels 48 pinioned on each of said shafts at a suitable point within each of the chambers 20, 18, and 19.

Figure 6:
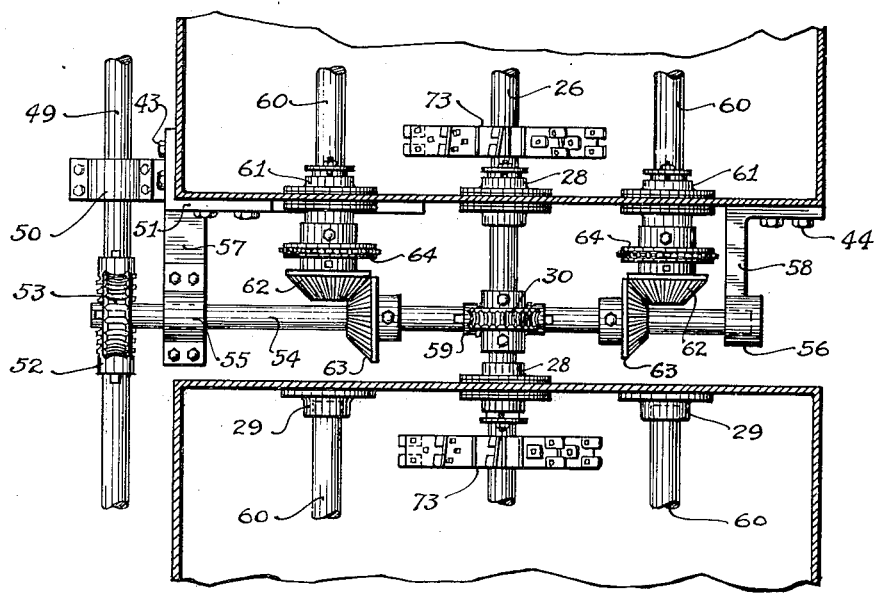
Figure 6 is a sectional view taken on line 6—6 of Figure 5.
Figure 7:
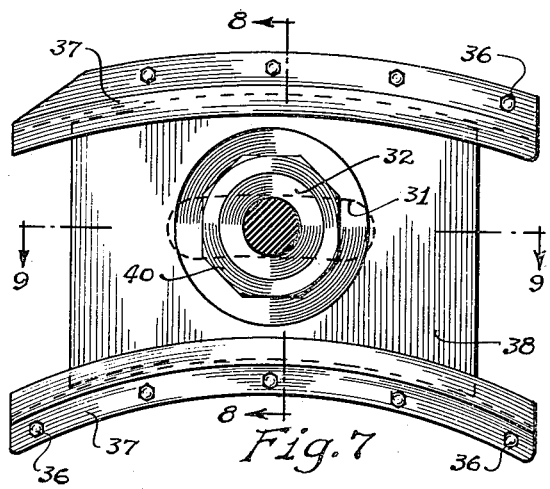
Figure 7 is an enlarged detailed view of the slidable bearings for carrying the upper adjustable beater shafts.
Figure 8:
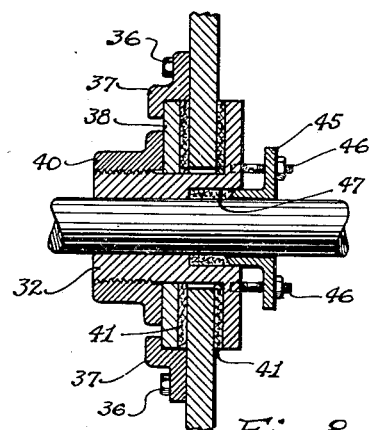
Figure 8 is a sectional view taken on line 8—8 of Figure 7.

Adjacent the side of the tank 1 an elongated shaft 49 is journaled in bearings 50 mounted on standards 51. At each of the chambers 20, 18, and 19, a worm 52 is pinioned on the shaft 49, said worms meshing with worm wheels 53 pinioned to shafts 54. The shafts 54 traverse the chambers 20, 18 and 19, at right angle to shaft 49 and are held in position by means of bearings 55 and 56 mounted on brackets 57 and 58 respectively. The bracket 57 is a part of standard 51. Standard 51 is secured to the tank by bolts 43. Bracket 58 on which is bearing 56 is held to the partition walls of the tank by bolts 44, as shown in Figures 5 and 6.

Figure 4:
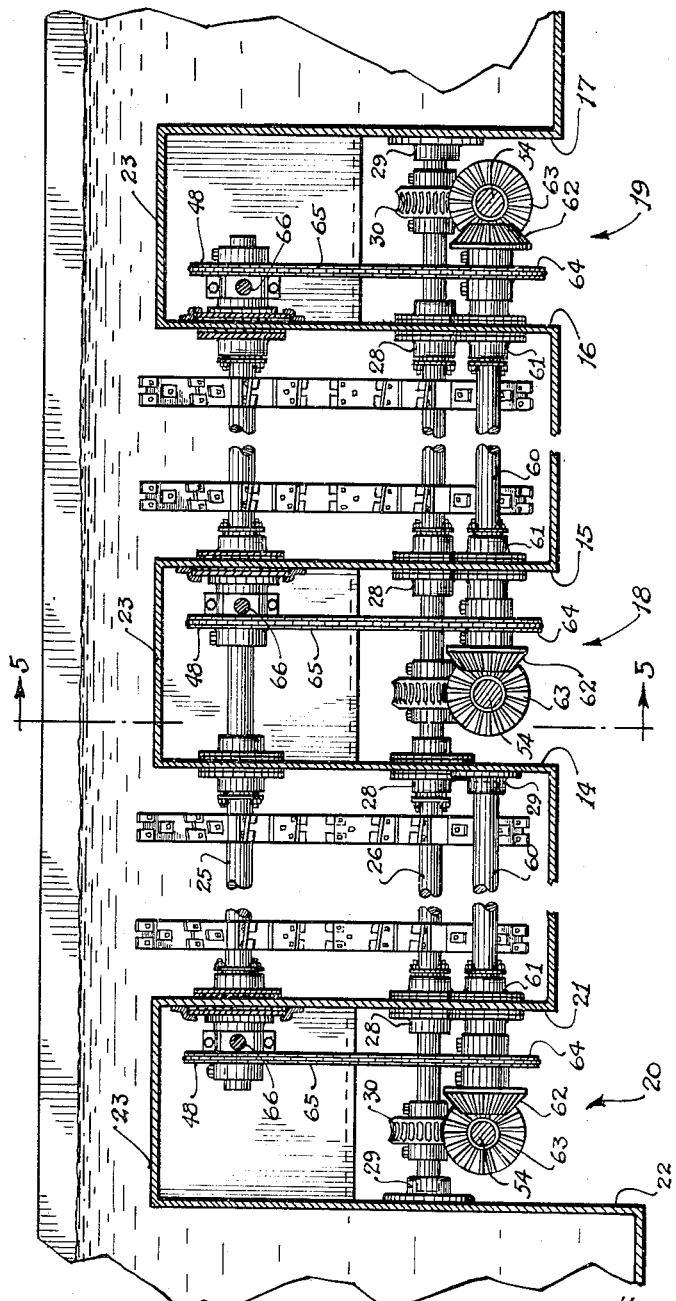
Figure 4 is an enlarged vertical sectional view similar to Figure 2, with parts of the several sections broken away, and showing in detail a side view of the driving mechanism of the beater shafts.

Referring to Figures 4 and 5, a worm 59 is pinioned to each of the shafts 54 to engage worm wheel 30 for the purpose of rotating lower beater shaft 26. Midway the slot 31 and centered with shafts 54, auxiliary shafts 60 are journaled in bearings 61, which are of the type shown in Figure 12, mounted in partition walls 21, 14, 15 and 16. The shafts 60 are driven by beveled gears 62 pinioned thereon at each of chambers 20, 18 and 19, meshing with beveled gears 63 pinioned to shafts 54. Sprocket wheels 64 are pinioned on the shafts 60 in relation to sprocket wheels 48, and the upper beater shafts 25 and 27 are caused to rotate by means of sprocket chains 65 trained on the respective sprocket wheels 48 and 64.

Figure 10:
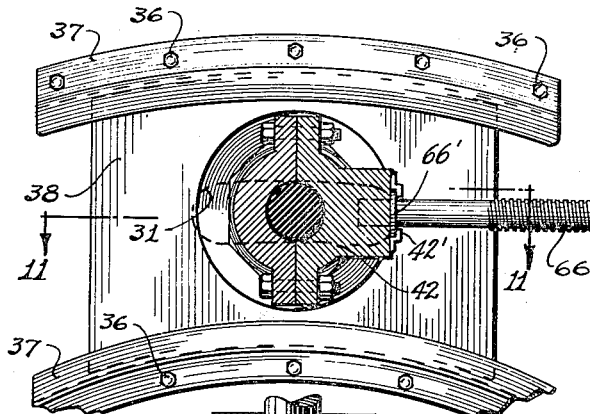
Figure 10 is a view of the adjustable bearings showing means attached thereto for adjusting.

The shafts 25 and 27 are held at fixed adjustments in the slots 31 by threaded shafts 66 (Figs. 10—11) mounted in threaded openings 67 in brackets 68 secured to the outer faces of partition walls 21, 15 and 16 by bolts 69. The threaded shafts 66 are pivotally connected with collar bearings 42, as by annular enlargement 66' and brackets 42'. The shafts 66 are rotated by means of hand wheels 70 secured to the free end of shafts 66 by means of nuts 71. It will be seen that each of the shafts 25 and 27 are adjusted at three points, namely, at partition walls 21, 15, and 16. In practice, the adjustments on each of the shafts are at all times the same, in order that in operation the shafts 25 and 27 will be parallel to each other and each parallel to shaft 26. The several adjustments on each of the shafts 25 and 27 may be kept in alinement by suitable indicia on the threaded portion of each of the shafts 66 to denote the revolutions thereof.

Figure 13:
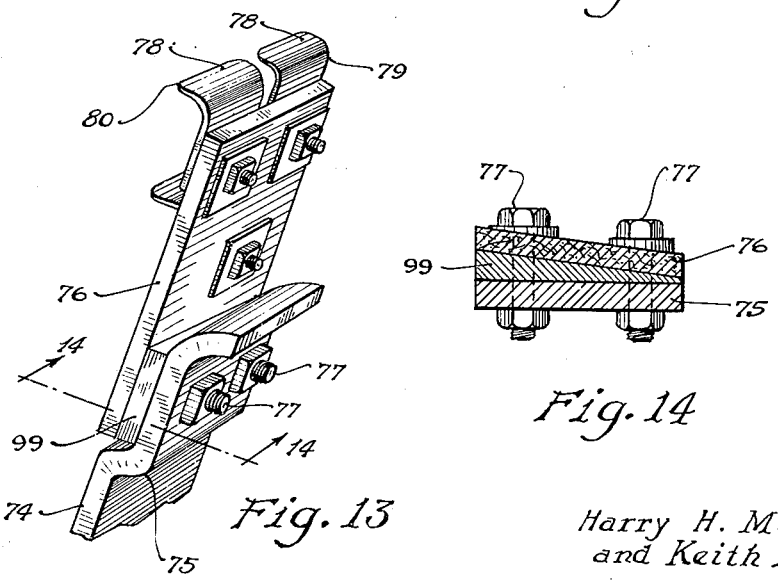
Figure 13 is a perspective view of a single beater blade.
Figure 14:
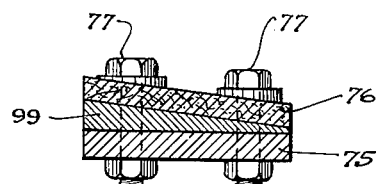
Figure 14 is a section on line 14—14 of Figure 13.

Pinioned on each of the beater shafts 25, 26 and 27 are a plurality of equidistant and correspondingly spaced collars 73. Integral with the collars 73 are a plurality of radially extending shanks 74, (Figure 13), each of said shanks having an offset portion 75 to which are affixed flexible beater arms 76. The beater arms 76 are made of elongated strips of fabric or other suitable material, and are held in position by means of bolts 77.

A metallic scraper 78 is bolted or riveted to the free end of each of the beater arms 76, said scraper comprising a small rectangle of heavy sheet metal material, bent at right angle near its free end at 79. The free end 80, while rather blunt to prevent tearing of the skins of the carcasses, is sufficiently beveled to act as a scraper. The scraper 78 is mounted against one side of the beater arm 76, with the free end pointing in the direction of the rotation of its respective shaft. The scrapers 78 of the several shafts, by reason of the collars being spaced in corresponding relation, will be cooperatively disposed.

Shims 99 of a graduating thickness are secured between shanks 74 and beater arms 76 by which scrapers 78 are angularly disposed in relation to their respective shafts, thereby providing means for automatically impelling the carcasses to the opposite end of the tank from which introduced. Scrapers 78 may be disposed at such an angle that the edges 80 of successive scrapers of successive collars will be in substantially spiral formation.

It will thus be seen that by rotating the scrapers 78 of the several shafts, forward motion of the carcass 100 in the direction of the arrows in Figure 1 is assured.

It will be noted in Figure 5 that by the use of proper worms 59 and the proper positioning of bevel gears 63, the shaft 25 will be rotated in a clockwise direction while shafts 26 and 27 will be rotated in a counter-clockwise direction, the purpose being that in the operation of the dehairing apparatus, the scrapers 78 of the shafts 26 and 27 will tend to rotate the hog carcasses in a clockwise direction which will be opposed by the beaters of shaft 25. The resistance offered by the beaters of shaft 25 will cause a scuffing action which will more quickly and completely remove the hair from the surface of the carcass.

As shown in Figures 1 and 2, an endless conveyor 81 is provided in the rinsing section to carry carcasses from such section to a gambrel conveyor 82 shown adjacent the rinsing section of the present invention. The conveyor 81 consists of an endless web belt traversing the interior of the rinsing section and extending from a point near the bottom of said section adjacent the dehairing section to a point above said section at the opposite end thereof. The conveyor 81 at its upper end is mounted on roller 84, rigidly secured to shaft 85, said shaft being journaled in bearings 86 mounted on standards 87. The standards 87 may be rigidly secured to angle irons 3 and 5 in any suitable manner. At its lower end, the conveyor 81 is mounted on roller 88, rigidly secured to shaft 89, journaled in bearings 90 mounted in the opposite sides of the rinsing section. A sprocket wheel 91 is pinioned at one end of shaft 85 and by means of chain 92 and sprocket 96 on conveyor 82, conveyor 81 receives its power and moves forwardly.

The shaft 49, by which the beater shafts are rotated, may be driven by any suitable means, but in practice an electric motor 94 of 25 H. P. is preferred. The motor 94 before engaging the shaft 49 is geared to a speed reducer 93 so that the shaft 49 will rotate at approximately 80 R. P. M.

As a scalding means, heated water is desirable, and is introduced from a continuous source 95, and is drained out through appropriate drains 97. Overflow is cared for by overflow pipes such as overflow pipe 98. Spray 83 is provided over the rinsing section for removing loose hair from the hog as it leaves the tank.

The hog carcasses enter the scalding section from the bleeding rail, and, after remaining there for a sufficient length of time, are guided by an operator with a pole, longitudinally through the first passageway 24 to the dehairing section. The carcasses, upon entering the dehairing section, will pass totally submerged in water of increasing temperature between the rotating beaters. The beaters on shafts 26 and 27 will partially scrape and dehair the hog carcass, and simultaneously rotate the carcass in a clockwise direction, as it will appear looking in the direction of Figure 3, which movement of the carcass will be resisted by the counter movement of the beaters on shaft 25, thereby causing a scuffing action and removal of the more stubborn hairs. The carcasses passing between the scrapers of the several shafts are supported by beater arms 76. It will be seen that by reason of the continual rotation of the carcass and the counter rotation of the shafts that the entire surface of the carcass, including the most inaccessible parts, will be completely and rapidly cleaned and dehaired.

The hog carcasses, during the dehairing operation, will, by reason of the angular setting of the scrapers, be simultaneously forwarded toward the rinsing section, without the aid of an operator or other conveying apparatus.

The carcasses upon entering the rinsing section will be picked up by an endless conveyor and automatically carried to a gambrel conveyor or other disposition.

The present invention affords a convenient, inexpensive, automatic apparatus whereby the entire surface of hog carcasses may be scalded, completely and thoroughly dehaired and cleaned, and rinsed, singly or in close succession, in one continuous operation.

While the foregoing specification sets forth the invention in specific terms, it is to be understood that numerous changes in the shape, size and materials may be resorted to without departing from the spirit and scope of the invention as claimed.

We claim:

1. In a dehairing apparatus of the class described, a tank, a plurality of opposed rotatable shafts mounted in said tank, a plurality of scrapers radially disposed on said shafts, and means for rotating one of said shafts in a direction opposite the others to provide a simultaneous scuffing and scraping dehairing action against the surface of carcasses passing between the scrapers of the several shafts.

2. In a dehairing apparatus of the class described, a tank, a plurality of parallel triangularly positioned shafts, scrapers radially extending from said shafts, and means for adjustably spacing said shafts to accommodate the varying weights of carcasses passing between the scrapers of the several shafts.

3. In a dehairing apparatus of the class described, a tank having related slots in the ends thereof, shafts mounted in said related slots in opposed relationship, radially disposed scrapers mounted on said shafts, and means for fixedly spacing said shafts in said slots.

4. In a device of the class described, a tank having related slots in opposite sides thereof, a shaft mounted in said slots, a fixed shaft rotatably mounted in said tank in opposed relationship to said first mentioned shaft, scrapers mounted on said shafts, and means for fixedly spacing said first mentioned shaft to and from said fixed shaft.

5. In a device of the class described, a tank, a plurality of triangularly positioned parallel shafts rotatably mounted in said tank, a plurality of collars in spaced relation on each of said shafts, a plurality of radially extending shanks on each of said collars, flexible beater arms secured at one end to said shanks, scrapers mounted on the opposite end of said beater arms and means for adjustably spacing the several shafts relative to each other.

6. In a dehairing apparatus of the class described including a tank having related slots in the ends thereof, rotatable shafts passing through said related slots and means for fixedly spacing said shafts in said slots comprising shaft carrying bearings mounted at said slots, a threaded collar secured to said tank adjacent each of said slots, a threaded shaft engaging said collar and pivotally mounted at one end to engage said related bearing and a hand wheel secured to the opposite end of said threaded shaft.

7. In a carcass dehairing device including a scalding tank, a pair of shafts rotatably mounted in opposed relationship in the tank, scrapers carried on each of the shafts and means for rotating the shafts in opposite directions to provide a simultaneous scraping and scuffing dehairing action against the carcasses passing between the scrapers of the several shafts.

8. In a carcass dehairing device including a scalding tank, a plurality of triangularly arranged shafts rotatably mounted in the tank, scrapers carried on each of the shafts and means for rotating one of the shafts in a direction opposite to the others to provide a simultaneous scraping and scuffing dehairing action against the carcasses passing between the scrapers of the several shafts.

9. In a carcass dehairing device including a scalding tank, a plurality of triangularly arranged shafts rotatably mounted in the tank, scrapers provided with flexible beater arms carried on each of the shafts and means for rotating one of the shafts in a direction opposite to the others to provide a simultaneous scraping and scuffing dehairing action against the carcasses passing between the scrapers of the several shafts, the flexible beater arms serving to support the carcasses passing between the scrapers of the several shafts.

10. In a carcass dehairing device including a scalding tank, a plurality of shafts rotatably mounted in opposed relationship in the tank for rotation in opposite directions, spaced collars provided with radially extending shanks carried on each of the shafts, and scrapers provided with flexible beater arms connected with each of the shanks, each of the scrapers being angularly pitched relative to the axis of its respective shaft for conveying carcasses through the tank, the beater arms serving to support the carcasses passing between the scrapers of the several shafts and the rotation of the several shafts in opposite directions providing a scraping and scuffing dehairing action against the carcasses passing between the scrapers.

11. A dehairing apparatus of the class described, comprising a tank including a scalding section, a dehairing section and a rinsing section, a plurality of shafts rotatably mounted in said dehairing section, and a plurality of scrapers having flexible beater arms mounted on said shafts, said beater arms serving to support carcasses passing between the scrapers of the several shafts.

12. A dehairing apparatus of the class described, comprising a tank including a scalding section, a dehairing section and a rinsing section, a plurality of shafts rotatably mounted in said dehairing section, a plurality of correspondingly spaced and cooperatively disposed scrapers having flexible beater arms carried by each of said shafts, said beater arms serving to support carcasses passing between the scrapers of the several shafts, and passageways connecting the several sections.

13. A dehairing apparatus of the class described, comprising a tank including a scalding section, a dehairing section and a rinsing section, a plurality of shafts rotatably mounted in said dehairing section, a plurality of cooperatively disposed scrapers having flexible beater arms carried by said shafts, said beater arms serving to support carcasses passing between the scrapers of the several shafts, passageways connecting the several sections, and means for automatically conveying carcasses from the rinsing section.

14. A dehairing apparatus of the class described, comprising a tank including a scalding section, a dehairing section and a rinsing section, a plurality of shafts mounted in said dehairing section, a plurality of cooperatively disposed scrapers having flexible beater arms carried by said shafts, said beater arms serving to support carcasses passing between the scrapers of the several shafts, and passageways connecting the several sections, each of said scrapers being angularly pitched relative to the axis of its respective shaft for automatically conveying carcasses through said dehairing section.

15. In a dehairing apparatus of the class described, a scalding tank, a plurality of shafts rotatably mounted in opposed relationship in said tank for rotation in opposite directions, and angularly disposed scrapers mounted on each of said shafts, said scrapers providing means for automatically conveying carcasses passing between the scrapers of the several shafts to the opposite end of said tank from which introduced, the rotation of said shafts causing a simultaneous scraping and scuffing dehairing action against the carcasses passing between the scrapers of the several shafts.

HARRY H. McKEE.
KEITH MUIR.